Dec. 27, 1960 R. L. PEACOCK 2,966,011
TIRE TRUING MACHINE
Filed Jan. 30, 1958 3 Sheets-Sheet 1
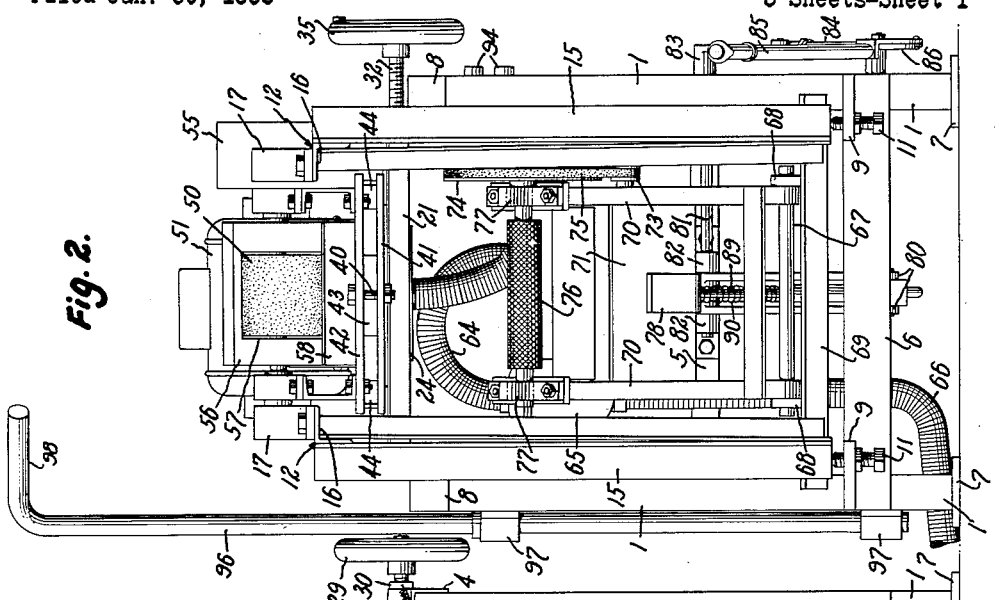
INVENTOR.
Roy L. Peacock
BY

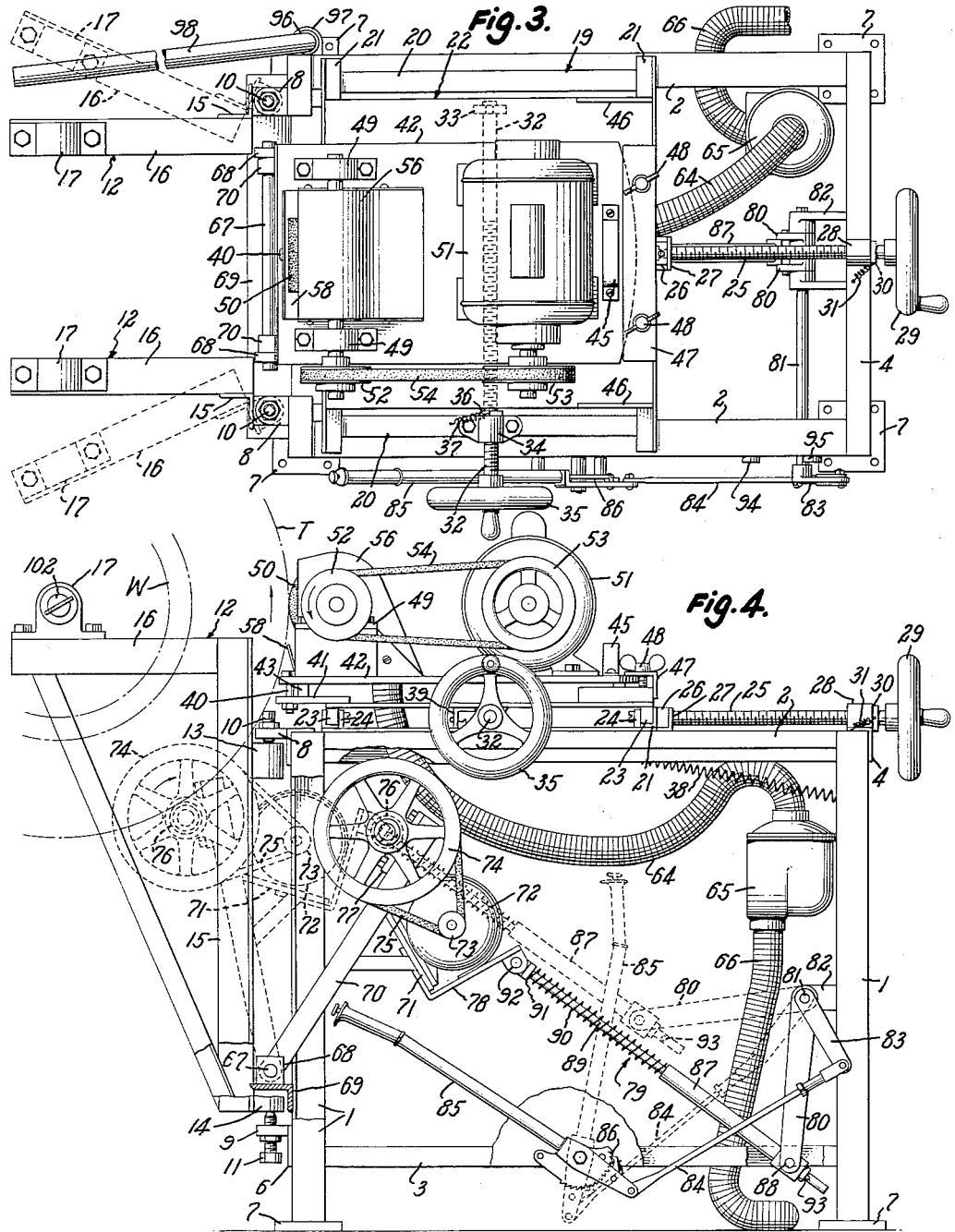

Dec. 27, 1960 R. L. PEACOCK 2,966,011
TIRE TRUING MACHINE
Filed Jan. 30, 1958 3 Sheets-Sheet 3
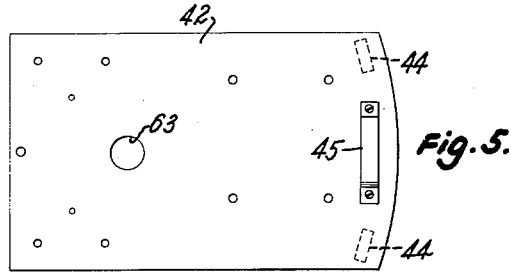
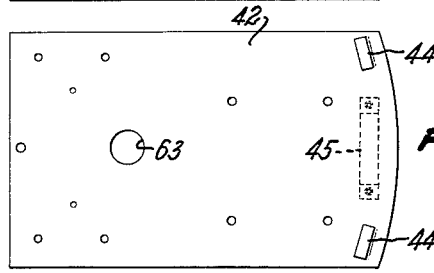
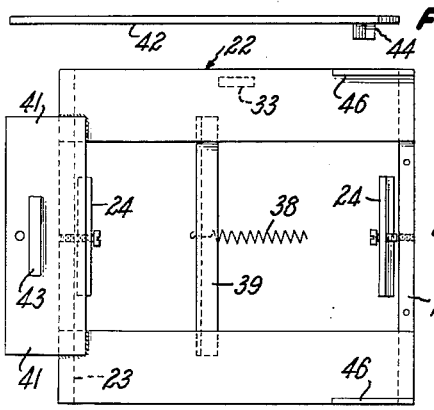
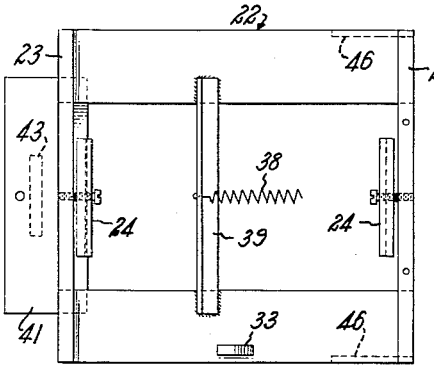
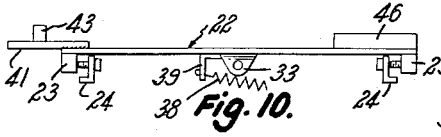
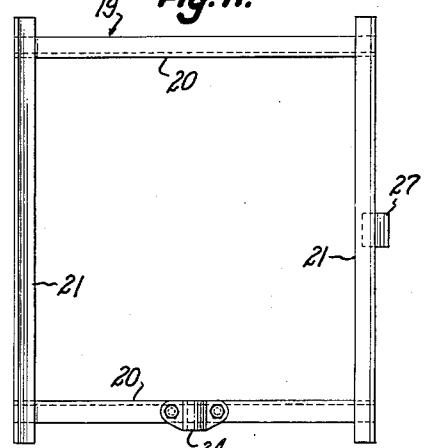
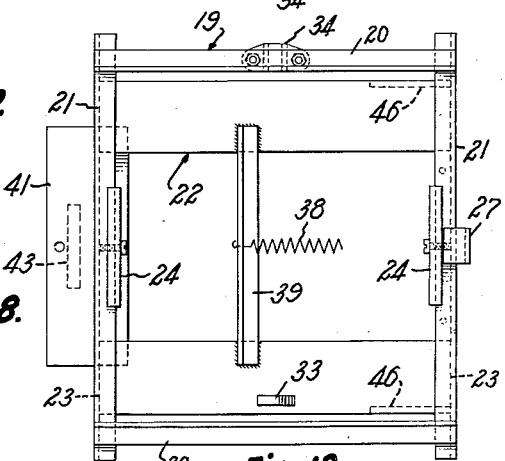
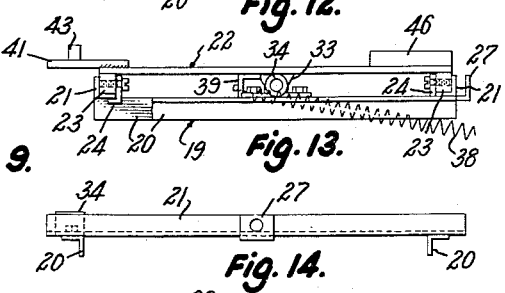
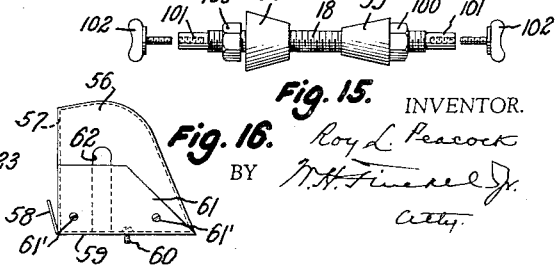
INVENTOR.
Roy L. Peacock
BY United States Patent Office 2,966,011
Patented Dec. 27, 1960

2,966,011
TIRE TRUING MACHINE

Roy L. Peacock, Amermac, Inc., P.O. Drawer 595, Ellaville Highway, Americus, Ga.

Filed Jan. 30, 1958, Ser. No. 712,228

4 Claims. (Cl. 51—33)

This invention relates to cutting, grinding, abrading and buffing machines, and it has special reference to a machine for truing the peripheries of the casings of motor vehicle tires.

One object of the invention is to provide a machine which will function to cut, grind, buff or similarly remove tread material from the periphery of a tire casing to restore it to true circular form.

Another object is to provide a tire truing machine which is essentially self-contained and capable of performing the complete tire truing operation.

A further object is to provide such a machine which is capable of ready adjustment to adapt it for operation upon tires of various diameters.

Another object is to provide a tire truing machine in which the parts subject to wear are easily replaceable.

Another object is to provide in such a machine means whereby the dust or cuttings removed from the tire and the fumes produced during the truing operation are conducted away from the grinding, cutting, abrading or buffing station, thus ensuring a substantially fume and dust free atmosphere in the vicinity of the machine and in this way serving to protect the machine operator.

A further object of the invention is to provide means for mounting the tire for the truing operation which facilitate mounting and dismounting of the tire with ease, thus promoting the utility of the machine.

Still another object is to provide an efficient and durable tire truing machine which may be manufactured and sold at a reasonable price and which is so proportioned as to occupy a minimum of floor space, thus making it suitable for acquisition and use by the owners of relatively small shops.

With these and other objects in view the invention comprises a machine for truing the casings of vehicle tires, and for other cutting, buffing, abrading and grinding operations, in which the work piece may be rotatively contacted with a rotary cutting, grinding, abrading or buffing tool, the machine having a bed frame, means for mounting the tire casing or work piece for rotation upon its axis upon said frame, a carriage shiftable upon said frame toward and away from the tire casing or work piece and carrying a buffing, abrading, cutting or grinding tool and drive means therefor upon mounting means which permit horizontal oscillatory and transverse shifting movement of the said tool with respect to the bed frame and the tire casing or work piece, and means operable at will for imparting rotation to the tire casing or work piece; and the invention comprises also various structural and operational details and refinements, all as will be explained hereinafter more fully and finally claimed.

In the accompanying drawings illustrating the invention, in the several figures of which like parts are similarly designated, Fig. 1 is a side elevation of the machine of the invention, Fig. 2 is a front elevation of such machine showing the same as viewed from the left of Fig. 1, Fig. 3 is a top plan view of the machine with the tire casing or work piece supporting brackets shown in opened-out position in broken lines, Fig. 4 is a side view similar to Fig. 1 but with shielding parts removed and other parts broken away to show concealed mechanism, and showing the means for imparting rotation to the tire casing or work piece in full lines in its retracted, inoperative position, and in broken lines in its projected, operative position, Figs. 5 and 6 are, respectively, a top plan view and a bottom plan view of the angularly adjustable, or horizontally oscillatable, table upon which the abrading, buffing, cutting or grinding tool and its drive means are mounted, Fig. 7 is a side or edge view of the table of Figs. 5 and 6, Figs. 8 and 9 are, respectively, a top plan view and a bottom plan view of the laterally shiftable platform which furnishes a movable support for the table of Figs. 5, 6 and 7, Fig. 10 is a side or edge view of the platform of Figs. 8 and 9, Fig. 11 is a top plan view of the carriage which is mounted for longitudinal shifting movement upon the bed frame, Fig. 12 is a bottom plan view of the carriage of Fig. 11 with the platform of Figs. 8 to 10 operatively assembled therewith, Fig. 13 is a side or edge view of the parts shown in Fig. 12, Fig. 14 is a rear elevation of the carriage of Figs. 11 to 13, Fig. 15 is an elevation of the tire or work piece mounting spindle and associated mounting securing elements, and Fig. 16 is a side elevation of the dust housing for the abrading, buffing, cutting or grinding tool.

Although the machine of the invention is not limited in its utility to a tire truing operation it will, for simplicity of description, be described and claimed hereinafter in relation to such utility.

Having reference to Figs. 1 to 4, it will be seen that the bed frame includes side frame members including uprights or legs 1 and upper and lower rails 2 and 3, respectively. These side frame members are rigidly connected in spaced parallelism at their rear ends by upper and lower transverse spreader bars 4 and 5, and at their front ends by a lower spreader bar 6, only, thus providing between the upper front end portions of the side frame members an open throat within which the tire casing to be operated upon, and the mechanism for operatively rotatively driving such tire, may be received, see Figs. 2, 3 and 4. The legs or uprights 1 are preferably furnished with bases or feet 7 for supporting the machine, and for bolting or otherwise securing it to a floor or other support when desired.

At their upper ends the front legs or uprights 1 of the bed frame are provided with bearing elements 8 and vertically aligned axially of these bearing elements 8 the spreader 6 at the lower ends of these uprights 1 is provided with bearing elements 9 complemental to the bearing elements 8. Supported for limited vertical adjustment at the front end of the bed frame on screwthreaded center pins 10 and 11 carried in the bearing elements 8 and 9 is a pair of similar L-shaped tire casing supporting brackets 12 having socketed lugs 13 and 14 adjacent to the upper and lower ends, respectively, of their uprights 15, and these lugs, cooperating with the center pins 10 and 11, provide for swinging movement (see broken lines Fig. 3), and desired vertical adjustment, of the brackets 12. Each of the brackets 12 is provided adjacent to the outer end of its horizontal arm 16 with a bearing member 17 of the universal center type, and between these two bearing members 17 the spindle 18, Fig. 15, for rotatively supporting the tire casing T, Fig. 4, may be mounted.

The parallel arrangement of the upper rails 2 of the bed frame adapts them for service as guide rails for a carriage 19 (see Figs. 11 to 14) having longitudinal angle bars 20 mounted in guiding, sliding contact with the guide rails 2, and transverse angle bars 21 which provide supports for a laterally shiftable platform 22 (see Figs. 8 to 10, 12 and 13) having runners 23 slidable upon the transverse angle bars 21 and located with respect thereto by stops 24 (Figs. 12 and 13). Adjustment of the carriage 19 longitudinally of the bed frame is accomplished by a screwthreaded shaft 25 (Figs. 1, 3 and 4) having its forward end rotatively anchored in a nut 26 seated in a socket element 27 affixed to the rearward transverse angle bar 21 of the carriage 19 and this shaft 25 is engaged with the interior screwthread of a bearing lug 28 fixed upon the rear upper spreader bar 4 of the bed frame and is provided with a hand wheel 29. A drag nut 30 and control spring 31 are provided for maintaining adjustment of the carriage 19 in predetermined position.

Transverse shifting of the platform 22 is accomplished by a screwthreaded shaft 32 having its end rotatively engaged in a lug 33 depending from the platform (see Fig. 3) and extending through a complementally screwthreaded bearing lug 34 carried by a longitudinal bar 20 of the carriage 19. This shaft 32 is provided with a hand wheel 35 and a drag nut 36 and control spring 37.

A biasing and vibration damping spring 38 having one end connected with a cross bar 39 of the platform 22 (see Figs. 1, 4, 8, 9, 10, 12 and 13) and its other end anchored to the rear of the bed frame (Fig. 4) serves to bias the carriage 19 and platform 22 toward the rear of the bed frame and prevent chatter of these parts due to operative vibration.

Carried by the platform 22 and pivoted for horizontal adjustment thereon by a pivot bolt 40 which connects its forward end with a forward extension plate 41 of the platform 22 is a table 42 spaced from the platform 22 by front and rear-bearing blocks 43 and 44, preferably affixed, respectively, to the upper surface of the platform 22 and to the lower surface of the table 42. Angular adjustment of the table 42 is aided by the provision at its rear end of a handle 45, and such adjustment is limited by stops 46 carried by the platform. Provision of a clamping plate 47 engageable with the rear end of the table 42 and secured to the platform 22 by thumb screws 48 serves to fix predetermined angular adjustment of the table 42 (see Figs. 1, 3 and 4).

Fixed upon the table in bearings 49 adjacent to its forward end is a rotary cutting tool, shown as a grinding, buffing or abrading wheel 50, to which rotation is imparted by an electric motor 51 through driven and driving pulleys 52 and 53, respectively, and a belt 54 preferably enclosed within a shield 55 (Figs. 1 and 2).

When the cutting, abrading, grinding or buffing tool is a grinding wheel, as shown, it is preferably a fine textured Carborundum wheel and is enclosed within a housing 56 having at its front end a window opening 57 through which a part of the periphery of the wheel projects, and a tire casing adjacent lip member 58 which preferably forms an extension part of the separable bottom plate 59 of the housing 56 serves to close the lower portion of the window opening 57 thus to direct cuttings, such as the grinding dust from the tire casing, into the housing. It will be noted (Fig. 16) that the bottom plate 59 of the housing 56 is secured to the table 42 by screws 60 and has side extensions 61 serving to close the shaft-clearing slots 62 in the sides of the housing which permit removal of the housing from the cutting, buffing, abrading or grinding tool, screws 61' being provided to hold the housing in operative position over the tool by securing it to the side extensions 61 of the bottom plate 59.

Suitably connected to the bottom plate 59 of the housing 56, and passing through an opening 63 (Figs. 5 and 6) in the table 42, is a flexible conduit 64 connected with a motor-driven suction fan 65 (Figs. 2, 3 and 4) having its exhaust coupled with a flexible conduit 66 so that the cuttings or grindings from the tire casing may be collected in the housing 56 and exhausted therefrom in order to maintain a proper working atmosphere, substantially dust and fume free, in the vicinity of the machine during its operation.

Pivoted upon a shaft 67 mounted for oscillation in bearing blocks 68 upon a bracket 69 spanning the uprights 1 at the front end of the bed frame is a carrier frame including a pair of spaced arms 70 connected by a mounting plate 71 (Figs. 2 and 4) which provides a mount for a motor 72 (Fig. 4) which, through pulleys 73 and 74 and a belt 75, will rotatively drive a knurled friction drive roller 76 (Figs. 2 and 4) having its shaft mounted in bearings 77 fixed to the arms 70. A bearing bracket 78 secured to the mounting plate 71 serves as a means for connection of operating link means 79 with lever arms 80 pivoted on a shaft 81 mounted in bearings 82 secured to the rear end of the bed frame and provided with a crank 83 arranged exteriorly of the side of the bed frame and connected through a link 84 with a hand lever 85 having a cooperating ratchet latching mechanism 86.

The link 79 includes a sleeve 87 having a fixed pivotal connection 88 with the lever arms 80 and a slide rod 89 passing freely through the sleeve 87 and surrounded by a biasing spring 90 bearing against the end of the sleeve 87 and against the clevis member 91 of the pivotal connection 92 of the rod 89 with the bearing bracket 78. Relative sliding of the rod 89 and sleeve 87 in response to expansion of the biasing spring 90 is limited by a stop pin 93 carried at the rear end of the rod 89 and serving to bear against the rear end of the sleeve 87.

The electrical circuits and wiring for the motors of the driving roller 76, grinding wheel 50 and exhaust fan 65 are of the conventional start, stop, push button control type, such control push buttons for the motors of the abrading, cutting, buffing or grinding tool and drive roller being indicated at 94 and 95 in Figs. 1, 2 and 3. The motor for the exhaust fan may, if desired, be operated continuously during use of the machine and controlled by a conventional on, off switch.

To assist the operator in locating a mounted tire, with the ends of the spindle 18 in the bearings 17, a crane 96 (Figs. 1, 2 and 3) may have its shaft arranged for rotation in bearings 97 affixed to an upright 1 of the bed frame and its horizontal arm 98 of a length, when swung over the brackets 12, to appropriately suspend a chain hoist or the like over the axis of the two aligned bearings 17.

Having reference particularly to Figs. 4 and 15, it will be seen that the mounting spindle 18 is provided with two axially adjustable cones 99 for engagement with the hub opening of the vehicle wheel, or driving disc, upon which the tire casing to be trued is mounted, these cones being backed up by jamb nuts 100. The ends of the spindle 18 are formed with reduced-diameter bearing trunnions 101 complemental to the universal center members of the bracket bearings 17 and are furnished with thumb screws 102 for fastening them rotatively in such center members.

In operation, an inflated tire casing T (Fig. 4) mounted upon its wheel disc W, or upon a dummy disc, is assembled upon the mounting spindle 18 with the lateral center of the casing periphery approximately at the longitudinal center of the spindle and the cones 99 are so adjusted as to axially center the disc and tire casing and are locked in position by the jamb nuts 100. The trunnion ends 101 of the spindle are then axially centered with the rotative centers of the bracket bearings 17, the brackets meanwhile being in approximately the separated position shown in broken lines, Fig. 3, and the bearings 17 are then closed in upon, and operatively engaged with, the ends 101 of the spindle by rotation of the brackets 12 upon their bearings 8—10—13, 9—11—14, and the thumb screws 102 are applied. If necessary, the axis of the spindle 18 may then be adjusted into substantially the horizontal plane of the axis of the abrading, cutting, buffing or grinding tool 50 by suitable adjustment of the center pins 10 and 11, thus insuring not only the positioning of the tire casing for true rotation of its lateral center in a vertical plane but accommodating it for most efficient grinding contact with the tool.

Next, the lever 85 is raised (turned clockwise) to cause the drive roller 76 to engage the periphery of the tire casing and this operation of the lever is continued until sufficient compression ofthe biasing spring 90 is effected (see broken line position, Fig. 4) to ensure proper driving contact of the roller 76 with the periphery of the tire casing, the lever 76 and its connected mechanisms being automatically locked in adjusted position by the ratchet mechanism 86 in a conventional manner.

Obviously, when rotation is imparted to the tire casing by energizing the roller driving motor 72, any vertical wobble of the casing will be noticed and can be promptly corrected by further adjustment of the center pins 10 and 11 of the brackets 12.

With the motor 72 for driving the roller 76 energized, or prior to such energization, and rotation thus imparted to the tire casing upon the bearings 17, the carriage 19, platform 22 and table 42 are adjusted longitudinally, laterally and angularly of the bed frame, and hence with respect to the periphery of the tire to so locate the periphery of the tool 50 that it will be in position for proper operative contact with that lateral portion of the tire casing tread periphery first selected to be operated upon, and the motor 51 is energized to impart rotation to the tool 50. As the periphery of the casing is cut by the tool the platform 22 and table 42 may be shifted laterally and angularly, respectively, to cause the tool to progressively engage the full lateral extent of the casing periphery, and if during this cutting operation the tool need be further approached to, or retracted from, the casing periphery this adjustment may be effected by proper operation of the hand wheel 29.

It will be noted by reference to Fig. 4 that the drive roller 76, which rotates clockwise, will drive the tire casing counter-clockwise, and that the tool 50 is driven counter-clockwise, as indicated by the arrows. The tool is preferably driven at high speed and its operation at such high speed has been found to be most effective for performing the tire-truing operation. Also the cuttings produced by this high speed cutting are usually in the form of a relatively fine dust which, with the exhaust fan 65 in operation, is drawn into the tool housing 56 through its window opening 57 and discharged through the conduit 66 preferably to a collector located exteriorly of the building in which the machine is located. Furthermore, much of the smoke and fumes which will normally be incident to such high speed cutting of rubber will be similarly collected and evacuated.

Various changes and modifications are considered to be within the principle of the invention and the scope of the following claims.

What I claim is:

1. A tire truing machine, comprising a bed frame including side frame members provided at their upper edges with guide rails, means whereby said frame members are connected in laterally spaced relation with said guide rails in spaced parallelism, a carriage mounted upon said guide rails for movement thereon longitudinally of said frame members and including transverse slide members, a platform supported by said slide members and slidable thereon transversely of said bed frame, a table carried by said platform and pivoted thereto at its forward end for oscillative movement horizontally thereon, a rotary cutting tool and means for driving same carried by said table and movable therewith and with said platform and carriage for oscillatory, transverse and longitudinal movement relative to said bed frame, means carried by said bed frame for rotatively supporting a vehicle tire upon its axis in longitudinally fixed relation to said bed frame with its tread portion in confronting spaced relation to the periphery of said cutting tool, a roller and drive means therefor carried by said bed frame and movable into driving engagement with the periphery of said tire for imparting rotation to same upon its axis, means for moving said roller into and out of driving engagement with said tire comprising a carrier for said roller and its drive means pivoted upon horizontal pivot means mounted at the front end of said bed frame, a lever arm and shaft pivoted on said bed frame remote from said carrier pivot, a spring biased link connecting said carrier and lever arm, a crank arm mounted on said shaft, a manually operable lever and means for releasably locking such lever in adjusted angular position, and a link connecting said crank arm and lever and capable of imparting movement therethrough to said lever arm and carrier, and separate means for shifting said carriage longitudinally of said frame members, said platform laterally of said carriage, and said table angularly of said platform, respectively, whereby as said tire is rotated said cutting tool may be adjusted longitudinally, laterally and angularly of the axis of rotation of the tire to provide for its proper truing cutting contact with the periphery of said tire to thereby provide for successive traversing truing cuts laterally thereof.

2. A tire truing machine as claimed in claim 1, in which said spring biased link comprises a pair of relatively movable longitudinally rigid elements one of which is connected with said carrier and the other with said lever arm, and a spring biasing member associated with said rigid elements and bearing thereagainst at its opposite ends to thus normally tend to increase the length of said link.

3. A tire truing machine, comprising a bed frame including side frame members provided at their upper edges with guide rails, means whereby said frame members are connected in laterally spaced relation with said guide rails in spaced parallelism, a carriage mounted upon said guide rails for movement thereon longitudinally of said frame members and including transverse slide members, a platform supported by said slide members and slidable thereon transversely of said bed frame, a table carried by said platform and pivoted thereto at its forward end for oscillative movement horizontally thereon, a rotary cutting tool and means for driving same carried by said table and movable therewith and with said platform and carriage for oscillatory, transverse and longitudinal movement relative to said bed frame, means carried by said bed frame for rotatively supporting a vehicle tire upon its axis in longitudinally fixed relation to said bed frame with its tread portion in confronting spaced relation to the periphery of said cutting tool, said means for rotatively supporting the vehicle tire including a pair of vertically pivoted brackets spaced apart substantially in alignment with said side frame members and carrying bearings having their axes transverse to the bed frame and substantially in the plane of the axis of rotation of said grinding wheel and a spindle serving as a rotative mount for the tire, the ends of said spindle being fashioned for engagement by said bearings and the pivotal mounting of said brackets serving to permit engagement of said bearings with the spindle ends and their disengagement therefrom with the tire mounted upon the spindle, a roller and drive means therefor carried by said bed frame and movable into driving engagement with the periphery of said tire for imparting rotation to same upon its axis, means for moving said roller into and out of driving engagement with said tire, and separate means for shifting said carriage longitudinally of same frame members, said platform laterally of said carriage, and said table angularly of said platform, respectively, whereby as said tire is rotated said cutting tool may be adjusted longitudinally, laterally and angularly of the axis of rotation of the tire to provide for its proper truing cutting contact with the periphery of said tire to thereby provide for successive traversing truing cuts laterally thereof.

4. A tire truing machine as claimed in claim 3, in which the means for vertically pivoting said brackets include axially adjustable pivot pins the adjustment of which will serve to properly locate the axis of rotation of the tire with respect to that of the grinding wheel.

References Cited in the file of this patent
UNITED STATES PATENTS

| | | |
|---|---|---|
| 1,886,859 | Wright | Nov. 8, 1932 |
| 2,149,774 | Ingleman | Mar. 7, 1939 |
| 2,189,203 | Glynn | Feb. 6, 1940 |
| 2,387,463 | Pagendarm | Oct. 23, 1945 |
| 2,394,556 | Martin | Feb. 12, 1946 |
| 2,651,893 | Bradley | Sept. 15, 1953 |
| 2,765,845 | Bullis | Oct. 9, 1956 |
| 2,787,089 | Hawkinson | Apr. 2, 1957 |